United States Patent
Dunn et al.

(10) Patent No.: US 9,482,168 B2
(45) Date of Patent: Nov. 1, 2016

(54) MID-CYCLE FUEL INJECTION STRATEGIES

(71) Applicant: Westport Power Inc., Vancouver (CA)

(72) Inventors: Mark E Dunn, Vancouver (CA); Alan B. Welch, Vancouver (CA)

(73) Assignee: WESTPORT POWER INC., Vancouver (CA)

( * ) Notice: Subject to any disclaimer, the term of this patent is extended or adjusted under 35 U.S.C. 154(b) by 0 days.

(21) Appl. No.: 14/738,838

(22) Filed: Jun. 13, 2015

(65) Prior Publication Data

US 2015/0308362 A1    Oct. 29, 2015

Related U.S. Application Data

(63) Continuation of application No. PCT/CA2013/050956, filed on Dec. 12, 2013.

(30) Foreign Application Priority Data

Dec. 20, 2012   (CA) .................................... 2799952

(51) Int. Cl.

| | |
|---|---|
| F02D 41/00 | (2006.01) |
| F02D 19/06 | (2006.01) |
| F02D 41/30 | (2006.01) |
| F02D 41/40 | (2006.01) |
| F02M 21/02 | (2006.01) |
| F02D 19/02 | (2006.01) |
| F02D 13/02 | (2006.01) |
| F02D 19/00 | (2006.01) |

(52) U.S. Cl.
CPC ....... *F02D 41/0027* (2013.01); *F02D 13/0223* (2013.01); *F02D 19/024* (2013.01); *F02D 19/0642* (2013.01); *F02D 19/0647* (2013.01); *F02D 41/0025* (2013.01); *F02D 41/3094* (2013.01); *F02D 41/402* (2013.01); *F02M 21/0215* (2013.01); *F02M 21/0275* (2013.01); *F02M 21/0278* (2013.01); *F02M 21/0284* (2013.01); *Y02T 10/32* (2013.01); *Y02T 10/44* (2013.01)

(58) Field of Classification Search
CPC .......... F02D 19/0647; F02D 19/0642; F02D 41/0027; F02D 41/0025
USPC ........... 123/300, 27 GE, 525, 527, 531, 575, 123/431
See application file for complete search history.

(56) References Cited

U.S. PATENT DOCUMENTS

| | | | |
|---|---|---|---|
| 2002/0166515 A1* | 11/2002 | Ancimer | ................... F02B 1/12 123/27 R |
| 2009/0012698 A1* | 1/2009 | Shinagawa | ......... F02D 13/0215 701/103 |

*Primary Examiner* — Mahmoud Gimie
(74) *Attorney, Agent, or Firm* — Carie Mager; C. L. Kyle

(57) ABSTRACT

A method and apparatus are disclosed for introducing a gaseous fuel into a combustion chamber of an internal combustion engine. The method includes dividing the engine map into three distinct operating regions, with different operating modes in each region. When the engine is operating in a low load region, gaseous fuel is introduced to the combustion chamber during an intake stroke before an intake valve associated with the combustion chamber closes. When the engine is operating in a high load low-speed region, gaseous fuel is directly injected into the combustion chamber during a compression stroke after the intake valve is closed. When the engine is operating in a high load high-speed region, a split injection strategy is employed with a first portion of the gaseous fuel introduced into the charge before the intake valve closes and a second portion being injected after the intake valve is closed.

24 Claims, 4 Drawing Sheets

MID-CYCLE FUEL INJECTION STRATEGIES

CROSS-REFERENCE TO RELATED APPLICATIONS

This application is a continuation of International Application No. PCT/CA2013/050956 having a filing date of Dec. 12, 2013, entitled "Mid-Cycle Fuel Injection Strategies", which claimed priority benefits from Canadian patent application No. 2,799,952 filed on Dec. 20, 2012. The '956 international application is hereby incorporated by reference herein in its entirety.

FIELD OF THE INVENTION

The present application relates to techniques of introducing gaseous fuel to an internal combustion engine according to fueling regions in an engine map determined as a function of engine operating conditions.

BACKGROUND OF THE INVENTION

Alternative fuels such as natural gas are being adopted by engine manufacturers in so called dual fuel, bi-fuel and flex-fueled engines. Dual fuel engines are fueled with more than one fuel type simultaneously, for example engines that consume natural gas as a main fuel and diesel as a pilot ignition fuel. Bi-fuel engines can consume more than one fuel type but are fueled with only one type at a time, such as engines that consume gasoline or natural gas, but not both together. Flex-fuel engines combine features of both dual fuel and bi-fuel engines and can consume more than one fuel type simultaneously or can operate on a single fuel. For example an engine that normally consumes either gasoline or natural gas but which can consume both fuels simultaneously according to engine operating conditions.

As a first step in adopting alternative fuels in directly injected gasoline engines, manufacturers integrated port injection systems that introduced a gaseous fuel such that the engine could operate as a bi-fuel or flex-fuel engine. An exemplary alternative fuel for these engines was natural gas. Since natural gas was considered an alternative fuel and not a primary fuel, these engines were optimized for operation with gasoline. When the engine was operating with natural gas it resulted in reduced power and torque compared to operation with gasoline. One reason for this reduced performance is the displacement of air by natural gas during the intake stroke. By displacing air in the cylinder there is less oxidant available for combustion with fuel, which reduces the average combustion pressure and power available to propel the vehicle.

As gasoline continues to increase in cost relative to natural gas and emission regulations become more stringent, engine manufacturers are motivated to improve bi-fuel and flex-fuel engines, in addition to mono-fuel engines, for operation on natural gas. One known technique for increasing power and performance in engines that consume natural gas is to introduce the gas at high pressure. This requires pressurizing natural gas to a high injection pressure, which involves extra components such as pumps, heat exchangers and high pressure piping that increase the cost of the fueling system.

Natural gas is a compressible fluid that takes considerably more energy and time to pressurize than gasoline, which is an incompressible fluid. In some applications the increased cost and extra time is offset by other economic and logistical factors, but in other applications it is not acceptable. Other techniques to improve natural gas operation in engines employed outward opening direct injectors. These injectors had inadequate flow rates that influenced the technique of introducing natural gas to the cylinders. The mixing of natural gas with the trapped charge was poor and resulted in lost combustion efficiency and reduced performance at higher engine speeds where the time windows available for injection and mixing were shorter.

United States Patent Application, Publication Number US 2003/0140902 A1, entitled "CNG Direct-Injection Into IC Engine" discloses a method for operating a four-stroke internal combustion engine with natural gas. The '902 application discloses whereby at high to full torque operating conditions, the natural gas is injected directly into the cylinder of the engine toward the end of the induction stroke or at the start of the compression stroke. This method claims to be able to inject the gaseous fuel without needing to generate a gas pressure higher than the storage pressure. However, a disadvantage of this system is that at such high load conditions, the engine consumes more fuel, and with a low gaseous fuel injection pressure it can be difficult to inject enough fuel into the cylinder early enough to allow sufficient time for mixing with the charge in the cylinder. The '902 application also claims that one of the advantages of its approach is that "switching to induction of fuel with the air is also avoided."

The state of the art is lacking in techniques for introducing gaseous fuel to an internal combustion engine as a function of engine operating conditions for improved performance.

SUMMARY OF THE INVENTION

A method is disclosed for introducing a gaseous fuel into a combustion chamber of an internal combustion engine comprising dividing an engine map into three distinct regions with a different operating mode in each region. A first region is a predetermined low load range and when the internal combustion engine is operating in the first region, the operating mode comprises introducing the gaseous fuel to the combustion chamber during an intake stroke before an intake valve associated with the combustion chamber closes. A second region is a predetermined high load low-speed range and when the internal combustion engine is operating in the second region, the operating mode comprises injecting the gaseous fuel directly into the combustion chamber after the intake valve closes. A third region is a predetermined high load high-speed range and when the internal combustion engine is operating in the third region, the operating mode comprises introducing a first portion of the gaseous fuel to the combustion chamber during an intake stroke before the intake valve closes and injecting a second portion of the gaseous fuel directly into the combustion chamber after the intake valve closes.

When the gaseous fuel is introduced during the intake stroke, if the fuel injection apparatus includes two separate fuel injectors, gaseous fuel can be introduced upstream of an intake valve whereby the gaseous fuel is inducted into the combustion chamber along with intake air. For example, with this method the inducted gaseous fuel can be introduced into the intake charge using a port injector, with the second injector being a direct injector for injected the gaseous fuel directly into the combustion chamber when the engine operates in one of the second or third predetermined operating regions.

When the gaseous fuel is introduced during the intake stroke, if the fuel injection apparatus includes only direct injectors for each combustion chamber, gaseous fuel can be injected directly into the combustion chamber while the intake valve associated with that combustion chamber is open. While this method does not have the advantages of mixing the gaseous fuel with the charge as it is inducted into the combustion chamber, this embodiment of the method does reduces the complexity of the system by reducing the number of components and still allows more time for the fuel to mix with the charge compared to a later injection timing after the intake valve is closed.

In some embodiments the method can further comprise closing the intake valve after bottom dead center during the compression stroke. For example, when the engine is operating in the first operating region, this can increase the amount of time available for introducing the gaseous fuel.

In another embodiment, the method can further comprise closing the intake valve during the intake stroke before bottom dead center. This can be beneficial when the engine is operating in the second region, because closing the intake valve earlier allows the timing to be advanced for start of injection (after the intake valve closes) and this allows more time for the gaseous fuel to mix with the charge, and because the gaseous fuel is injected after the intake valve has closed it has not displaced any of the charge that is inducted into the combustion chamber while the intake valve was open. When the intake valve is closed before bottom dead center the method can further comprise increasing intake manifold air pressure such that an increased amount of oxygen is inducted into the combustion chamber before the intake valve closes, offsetting the effect of closing the intake valve before bottom dead center and reducing the time for inducting the charge.

The method can further comprise adjusting the timing for intake valve closing depending upon the particular operating region. This embodiment of the method can be enabled when the engine is equipped with a variable valve timing system.

When the engine is operating in the second or third region, in preferred embodiments, timing for start of injection for injecting the gaseous fuel directly into the combustion chamber after the intake valve is closed, is between 150 and 210 crank angle degrees before top dead center. Bottom dead center is 180 crank angle degrees before top dead center, so when the timing for start of injection is between 180 and 210 crank angle degrees before top dead center this is for embodiments when the intake valve is closed during the intake stroke before bottom dead center. The timing for "end of injection" for the directly injected gaseous fuel depends upon the timing for the start of injection, and is preferably timed to occur between 65 and 200 crank angle degrees before top dead center, with an earlier timing being preferred to allow more time for mixing. The timing for start of injection and end of injection is determined with the intention of reducing the duration of the injection pulse as much as possible as permitted by the available injection pressure and the overall engine design. This influences the sizing of the orifices in the injector nozzle. In preferred embodiments the orifices are sized for a choked flow condition through the nozzle for higher injection velocities for improved mixing.

In preferred embodiments when injecting the gaseous fuel directly into the combustion chamber, the gaseous fuel is supplied to a fuel injector with an injection pressure between 20 and 40 bar. In such embodiments, the method can further comprise compressing the gaseous fuel to the injection pressure when the gaseous fuel is stored in gaseous form, or pumping the gaseous fuel to the injection pressure when the gaseous fuel is stored in liquefied form.

In a preferred method the second and third regions are divided by a predetermined power demarcation line. In an alternative embodiment, the second and third regions are divided by a fixed predetermined engine speed.

The gaseous fuel can be natural gas, methane, natural gas and hydrogen blends, methane and hydrogen blends, propane as well as other suitable gaseous fuels. In this disclosure, a "gaseous" fuel is defined to be a fuel that is suitable for combusting in an internal combustion engine and that is in a gaseous form at atmospheric pressure and temperature.

An embodiment of the method for introducing a gaseous fuel into a combustion chamber of an internal combustion engine comprises, introducing the gaseous fuel into the combustion chamber during an intake stroke in a first region of an engine map associated with operating the internal combustion engine; introducing the gaseous fuel into the combustion chamber during a compression stroke in a second region of the engine map after an intake valve associated with the combustion chamber closes; and introducing the gaseous fuel into the combustion chamber during both the intake stroke and the compression stroke in a third region of the engine map; wherein the first region is a low load region of the engine map, the second region is a high load region of the engine map below at least one of a predetermined power level and a predetermined speed, and the third region is a high load region of the engine map above the at least one of the predetermined power level and the predetermined speed.

In this disclosure the engine map is defined by a first engine parameter along an x-axis and a second engine parameter along a y-axis. In preferred embodiments the first engine parameter is engine speed, and the second engine parameter is one of torque and fuel quantity per cycle.

For implementation of the method and apparatus is disclosed for introducing a gaseous fuel into a combustion chamber of an internal combustion engine. This apparatus comprises a fuel injection apparatus for introducing the gaseous fuel into a charge for the internal combustion engine, the fuel injection apparatus comprising a direct fuel injector for injecting the gaseous fuel directly into the combustion chamber; a controller programmed to actuate the fuel injection apparatus according to three operating modes. More specifically, the controller is programmed to: (a) introduce gaseous fuel into the charge during an intake stroke while an intake valve associated with the combustion chamber is open, when the internal combustion engine is operating in a first operating mode, defined by a predetermined low load range; (b) actuate the direct fuel injector to inject the gaseous fuel directly into the combustion chamber after the intake valve is closed, when the internal combustion engine is operating in a second operating mode, defined by a predetermined high load low-speed range; and (c) split fuel injection into two pulses whereby a first portion of the gaseous fuel is introduced into the charge during an intake stroke while the intake valve is open, and a second portion is introduced by actuating the direct fuel injection to inject the fuel directly into the combustion chamber after the intake valve is closed, when the internal combustion engine is operating in a third operating mode defined by a predetermined high load high-speed range.

In one embodiment the fuel injection apparatus can further comprises a port fuel injector associated with a port leading into the combustion chamber for introducing the gaseous fuel upstream of the intake valve whereby it is inducted into the combustion chamber with the intake charge. In another embodiment the direct fuel injector is operable by the controller to introduce gaseous fuel into the charge during an intake stroke.

The engine can employ conventional timing for opening and closing the intake valve but different timings for opening and closing the intake valve can be employed, particularly if the engine has a variable valve timing system so that different timings for opening and closing the intake valve can be used for different operating modes. For example, in some embodiments, the intake valve is operable to close during the intake stroke before bottom dead center to allow the timing to be advanced for start of injection for directly injected fuel that is injected after the intake valve is closed. In other embodiments, the intake valve is operable to close during the compression stroke after bottom dead center to allow more time for injecting fuel that is introduced before the intake valve is closed.

DETAILED DESCRIPTION OF ILLUSTRATIVE EMBODIMENT(S)

Figure 1:
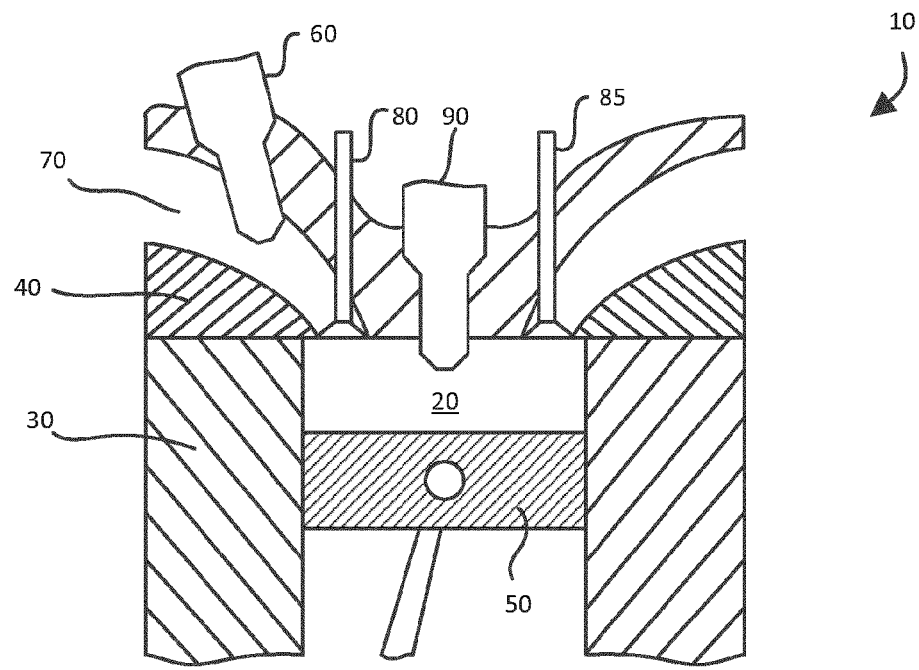
FIG. 1 is a partial schematic view of an internal combustion engine comprising a direct fuel injector and a port fuel injector for introducing gaseous fuel to a combustion chamber of the engine in conformity with fueling regions in an engine map determined as a function of engine operating conditions.

A first embodiment of a technique for introducing gaseous fuel to an internal combustion engine is illustrated in FIGS. 1, 2, 3 and 4. With reference to FIG. 1, engine 10 comprises combustion chamber 20, which in this example is defined by cylinder wall 30, cylinder head 40 and piston 50. Only one cylinder is shown in FIG. 1 although engine 10 normally comprises two or more cylinders, and the technique disclosed herein applies to engines having one or more cylinders. Port fuel injector 60 introduces gaseous fuel to intake manifold 70 upstream of intake valve 80 such that a charge of at least air and gaseous fuel is sucked into combustion chamber 20. Direct fuel injector 90 directly introduces gaseous fuel to combustion chamber 20. In the present embodiment engine 10 comprises a throttle (not shown) employed to control the intake of air into combustion chamber 20. In other embodiments engine 10 can comprise liquid fuel injectors that introduce a liquid fuel, such as gasoline, directly into combustion chamber 20 or upstream of intake valve 80.

Figure 2:
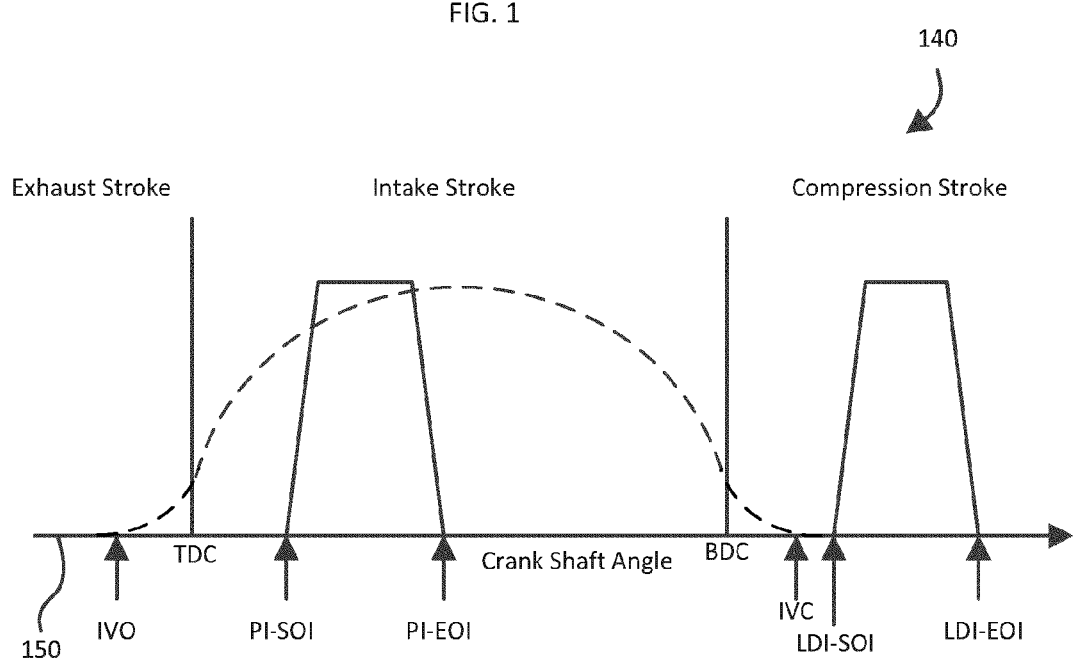
FIG. 2 is a plot of an engine cycle event line illustrating intake valve events and early and late fuel injection events during exhaust, intake and compression strokes of the internal combustion engine of FIG. 1. In this disclosure, "late" fuel injection events are defined as being late relative to the "early" injection events which are timed to occur before the intake valve associated with the combustion chamber has closed. The "late" fuel injection events occur after the intake valve closes and during the early part of the compression stroke. Accordingly, the "late" fuel injection events described are much earlier than the late timing for fuel injection events normally associated with diesel-cycle engines.

Referring to FIG. 2, engine cycle event line 140 illustrates respective events during exhaust, intake and compression strokes for each cylinder of engine 10. The timing of events is measured by way of crank shaft angle position measured in degrees before and after top dead center (TDC) and bottom dead center (BDC) along axis 150. Intake valve 80 starts opening at intake valve opening (IVO), which begins during the exhaust stroke. Intake valve 80 is closed at intake valve closed (IVC), which occurs during the compression stroke. Between intake valve opening (IVO) and intake valve closed (IVC) intake valve 80 is open allowing a charge to enter combustion chamber 20.

Port fuel injector 60 starts introducing gaseous fuel at port injection-start of injection (PI-SOI), which begins during the intake stroke. Port injection-start of injection (PI-SOI) can be soon after intake valve opening (IVO), for example as soon as forward flow is established into the cylinder and scavenging of exhaust gases is complete, or at least mostly complete, after exhaust valve 85 closes. Port fuel injector 60 stops introducing gaseous fuel at port injection-end of injection (PI-EOI), which occurs before intake valve closed (IVC) during the intake stroke. Between port injection-start of injection (PI-SOI) and port injection-end of injection (PI-EOI) gaseous fuel is introduced into intake manifold 70 where it is sucked into combustion chamber 20 through an intake port past intake valve 80. The duration between port injection-start of injection (PI-SOI) and port injection-end of injection (PI-EOI) is based on the desired early injection amount and the desired early injection rate when variable rate injection is employed. The desired early injection amount is selected to provide a desirable overall trade-off between emissions, fuel economy and torque output. Injector 60 is actuated to introduce fuel in fueling regions A and C, as seen in FIGS. 3 and 4.

Direct fuel injector 90 starts introducing gaseous fuel at late direct injection-start of injection (LDI-SOI), which begins during the compression stroke after intake valve closed (IVC). Direct fuel injector 90 stops introducing gaseous fuel at late direct injection-end of injection (LDI-EOI), which occurs during the compression stroke before top dead center. Between late direct injection-start of injection (LDI-SOI) and late direct injection-end of injection (LDI-EOI) gaseous fuel is introduced directly into combustion chamber 20. The duration between LDI-SOI and LDI-EOI is based on the desired overall equivalence ratio and the desired late injection rate when variable rate injection is employed. In a preferred embodiment, late direct injection-end of injection (LDI-EOI) occurs as soon as possible to increase the amount of time available for mixing and to allow injection of the desired amount of fuel while reducing the amount of energy needed to raise the pressure of the gaseous fuel. Depending upon the size and design of the engine, if the timing for directly injecting gaseous fuel ends earlier than about 65 crank angle degrees before top dead center, then the in-cylinder pressure is typically between about 7 and 15 bar. Thus, it is desirable when directly injecting the gaseous into a combustion chamber to set the timing for start of injection as soon as possible after the intake valve closes, and to complete injection as quickly as possible, before in-cylinder pressure increases to a level that requires higher injection pressures. In some embodiments, depending upon whether the gaseous fuel is stored in liquefied form or gaseous form, the fuel system can further comprise a pump or compressor to elevate the gaseous fuel to a pressure between 20 and 40 bar for direct injection into the combustion chamber. Higher injection pressures allow the fuel to be injected in a shorter amount of time, but require more energy to pressurize the gaseous fuel. A desirable combination of injection pressure and injection timing can be determined based on an engine's particular characteristics. In general, engines that operate at lower speeds can use a lower injection pressure with a longer injection pulse width, but engines that normally operate at higher speeds can use a higher injection pressure to allow shorter pulse widths. Direct fuel injector 90 is actuated to introduce fuel in fueling regions B and C, as seen FIGS. 3 and 4.

Figure 3:
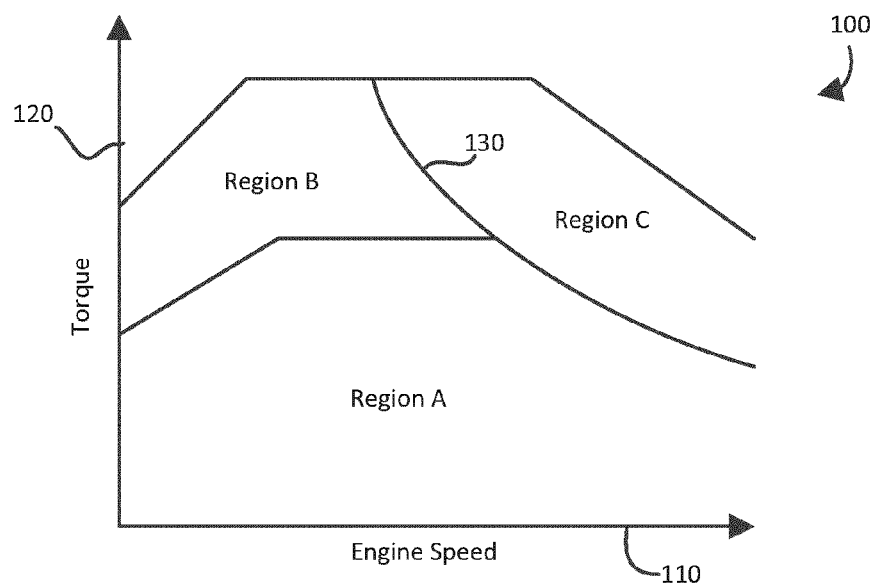
FIG. 3 is a plot of the engine map for the internal combustion engine of FIG. 1 illustrating fueling regions A, B and C for which each has a corresponding fueling strategy. Fueling regions B and C are separated by a predetermined power.

FIG. 3 shows a plot of engine fueling map 100 comprising fueling regions A, B and C. Entry into map 100 is defined by engine speed along x-axis 110 and torque along y-axis 120. Engine parameters other than engine speed and torque can be employed to enter into map 100. For example, instead of torque, fuel quantity per cycle can be employed along y-axis 120. Different fuel introduction strategies are employed in each of the fueling regions A, B and C, to improve various performance parameters, such as efficiency, emissions, torque and power of engine 10. The performance parameters that are improved in each of the fueling regions vary. Fueling region A is employed during light load conditions. Fueling region B is employed during high load conditions and speeds up to a power demarcation line 130. Fueling region C is employed during high load conditions and speeds greater than power demarcation line 130.

Figure 4:
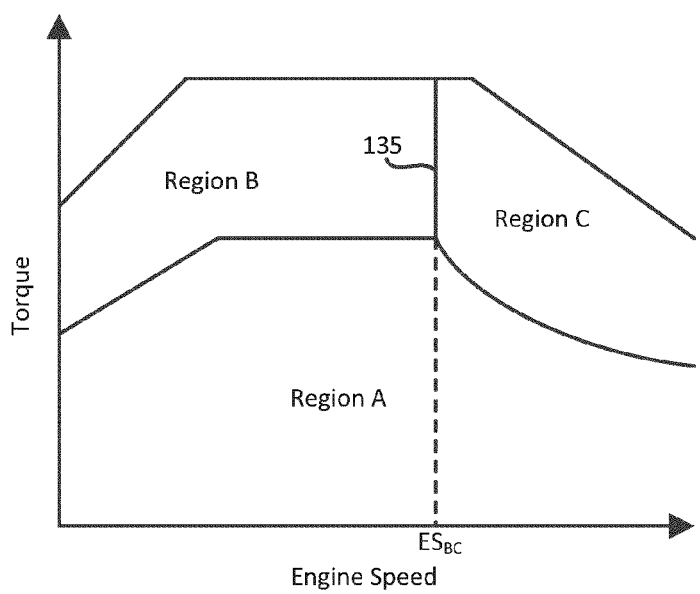
FIG. 4 is a plot of an engine map according to another embodiment for the internal combustion engine of FIG. 1 illustrating fueling regions A, B and C for which each has a corresponding fueling strategy. Fueling regions B and C are separated by a predetermined speed.

FIG. 4 shows a plot of engine fueling map 100 according to another embodiment, where like parts to the embodiment of FIG. 3 have like reference numerals, and only the differences are discussed. Fueling region B is separated from fueling region C by a predetermined speed (ES BC) according to speed demarcation line 135. In other embodiments, fueling regions B and C can be separated according to a combination of power and speed as a function of engine operating conditions.

Various fueling strategies for each of the fueling regions in engine map 100 are utilized. Region A in FIGS. 3 and 4 comprises a fueling strategy where gaseous fuel is introduced to combustion chamber 20 during the intake stroke by way of port fuel injector 60 according to the timing described in relation to FIG. 2. This fueling strategy maximizes, or at least increases, mixing potential and deliberately allows intake air to be displaced by gaseous fuel, thereby reducing throttling losses and improving engine efficiency. In a spark-ignited throttled-engine operating near and preferably at stoichiometry, at low loads the throttle is adjusted to introduce less air into combustion chamber 20 due to the reduced power requirement. This results in throttling losses where piston 50 is drawing in air through valve 80 at less than atmospheric pressure. Engine 10 is doing work to suck air into combustion chamber 20. When a portion of the air introduced into combustion chamber 20 is displaced by gaseous fuel, the throttle can be relaxed and the piston can suck in air and gaseous fuel at a pressure closer to atmospheric pressure than previous, thereby requiring less work from engine 10, and reducing throttling losses. The long mixing time will help to eliminate, or at least reduce rich mixture and over-lean mixture zones thereby allowing the combustion flame to propagate which results in lower particulate and hydrocarbon emissions. Port fuel injectors can be selected for longer injection periods at idle and part load, reducing the need for variable pressure regulation or variable lift direct injectors.

Fueling region B in FIGS. 3 and 4 comprises a fueling strategy where gaseous fuel is directly introduced to the cylinder by way of direct fuel injector 90 during the compression stroke after intake valve closed (IVC), according to the timing described above in relation to FIG. 2. The maximum injection period (the difference between LDI-EOI and LDI-SOI) is limited to increase the amount of time after fuel introduction for mixing. Fueling region B allows more air (oxygen) to enter combustion chamber 20 during the intake stroke since gaseous fuel is introduced after intake valve closed (IVC) and therefore does not displace the intake charge. This allows more fuel to be consumed within combustion chamber 20 increasing average combustion pressure thereby providing more torque and power.

Fueling region C comprises a fueling strategy where gaseous fuel is introduced to the cylinder by a combination of both port fuel injector 60 and direct fuel injector 90. In fueling region C each injector is actuated according to its respective timings as described above in relation to FIG. 2. In fueling region B, as the engine speed is increased at a particular torque, eventually the speed is sufficiently fast that the fuel introduced during the compression stroke cannot mix adequately and/or there isn't enough time for fuel introduction based on the fuel injection pressure. To overcome these problems, in fueling region C a portion of total fuel introduced to combustion chamber 20 is introduced during the intake stroke. Port injection allows a lean mixture to be developed over a longer period. This lean mixture is enriched with a late direct injection once the intake valve closes. Since the first mixture is lean, less intake air is displaced than would be the case for a stoichiometric mixture. The late direct injection after intake valve closed (IVC) increases the mixture richness to the final value that is close to stoichiometric. Since the late injection in region C has a reduced quantity compared to the full fuel quantity, the injection period is reduced, allowing more time for mixing.

Port fuel injectors 60 can be employed to introduce fuel when gaseous fuel tank pressure drops below the injection pressure range for direct fuel injectors 90. The injection pressure range for conventional port fuel injectors is typically in the 1 to 10 bar range.

Figure 5:
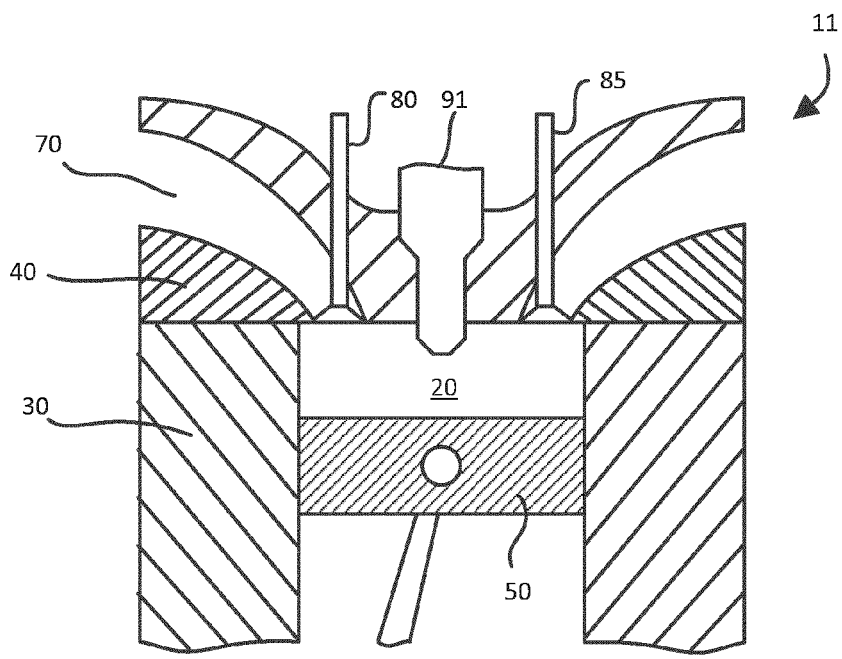
FIG. 5 is a partial schematic view of an internal combustion engine comprising a direct fuel injector according to another embodiment for introducing gaseous fuel to a combustion chamber of the engine in conformity with fueling regions in an engine map determined as a function of engine operating conditions.
Figure 6:
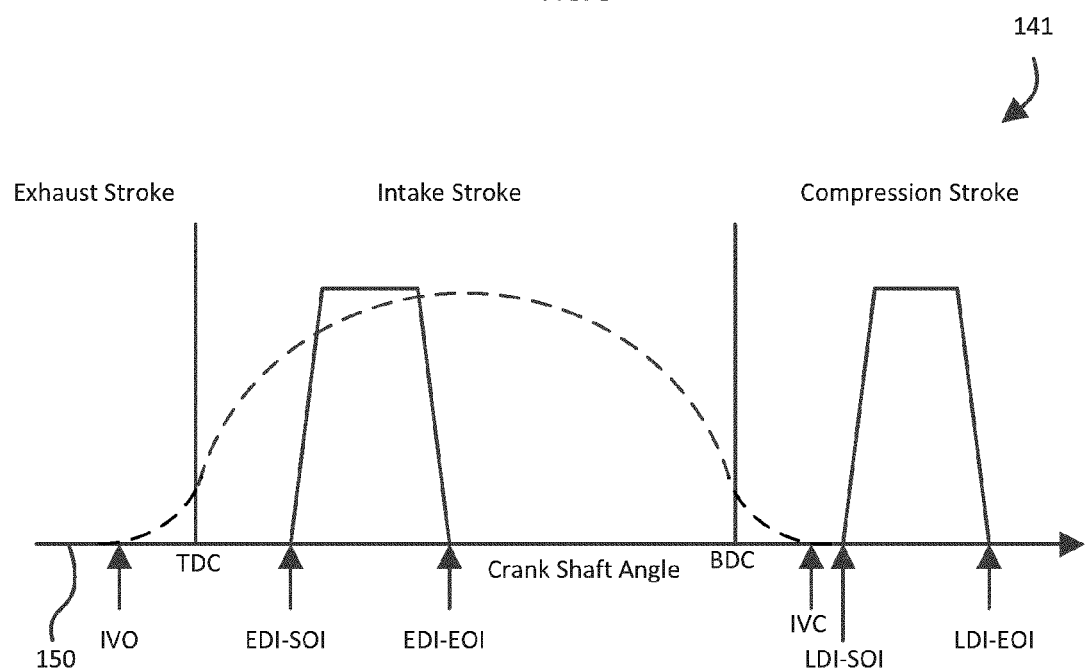
FIG. 6 is a plot of an engine cycle event line illustrating intake valve events and early and late fuel injection events during exhaust, intake and compression strokes of the internal combustion engine of FIG. 5.

Referring now to FIGS. 5 and 6, and first to FIG. 5, a second embodiment of a technique for introducing gaseous fuel to an internal combustion engine is illustrated where like parts to the previous embodiment have like reference numerals and may not be described in detail, if at all. Direct fuel injector 91 introduces gaseous fuel to combustion chamber 20. Engine 11 in the present embodiment is operated, similar to the previous embodiment, according to at least one of engine maps 100 of FIGS. 3 and 4. Engine cycle event line event line 141 of FIG. 6 is similar to that of FIG. 2, and the fueling strategies in regions A, B and C of the present embodiment are similar to the previous embodiment.

Injector 91 can function to introduce gaseous fuel during the intake stroke and alternatively, or in addition to, during the compression stroke. When introducing fuel during the intake stroke, direct fuel injector 91 starts introducing gaseous fuel at early direct injection-start of injection (EDI-SOI). Early direct injection-start of injection (EDI-SOI) can be soon after intake valve opening (IVO), for example as soon as forward flow is established into the cylinder and scavenging of exhaust gases is complete after exhaust valve 85 closes. Injector 91 stops introducing gaseous fuel during the intake stroke at early direct injection-end of injection (EDI-EOI), which occurs before intake valve closed (IVC). Between EDI-SOI and EDI-EOI gaseous fuel is directly introduced into combustion chamber 20. Throttling losses are reduced at low loads when direct injector 91 introduces gaseous fuel during the intake stroke before intake valve 80 is closed. Late direct injection-start of injection (LDI-SOI) and late direct injection-end of injection (LDI-EOI) are similar to the previous embodiment.

The fueling strategies in regions A and C employ early direct injection during the intake stroke. Employing a direct fuel injector, instead of a combination of a direct fuel injector and a port fuel injector, reduces the cost of the fuel system for engine 11 the failure rate by eliminating mechanical parts. Direct fuel injector 91 can be a variable rate fuel injector having a turn-down ratio that allows fuel introduction at a reduced rate during the intake stroke and at an increased rate during the compression stroke. The reduced rate during the intake stroke improves mixing with the charge in the combustion chamber by providing more consistent mixing. The increased injection rate during the compression stroke is advantageous since it increases the time available for mixing with the charge in the combustion chamber. Direct injectors 90 and 91 can be the same type of injector, which can be a variable rate injector or a standard fuel injector with a single fuel flow rate.

Certain performance improvements can be achieved with the techniques of the present disclosure. The fueling strategy in region A improves efficiency and reduces emissions, such as particulate matter and unburned hydrocarbons. The fueling strategy in region B improves torque output and response. The fueling strategy in fueling region C improves power output and efficiency compared to both a port injection only strategy and a single direct injection strategy.

Figure 7:
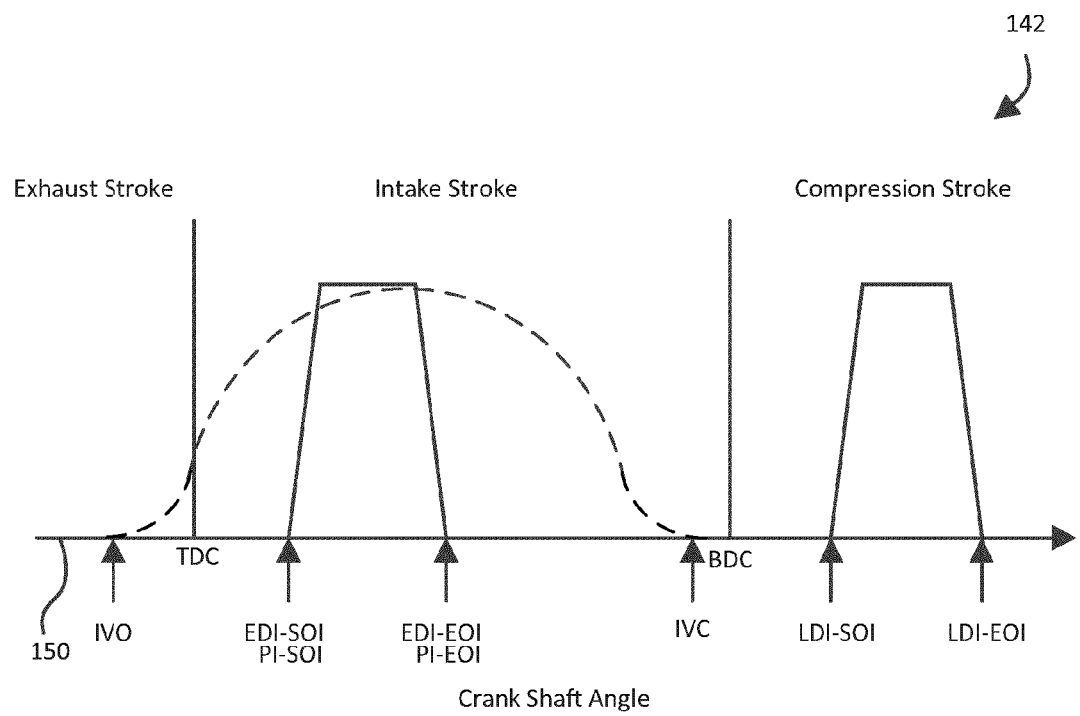
FIG. 7 is a plot of an engine cycle event line according to another embodiment illustrating intake valve events and early and late fuel injection events during exhaust, intake and compression strokes of the internal combustion engine of FIG. 1 or 5.

Referring now to FIG. 7, a third embodiment of a technique for introducing gaseous fuel to an internal combustion engine is illustrated where like parts to the previous embodiments have like reference numerals and may not be described in detail, if at all. Engine cycle event line 142 can be employed with engine 10 in FIG. 1 and with engine 11 in FIG. 5. When used with engine 10, PI-SOI and PI-EOI are employed, and when used with engine 11, EDI-SOI and EDI-EOI are employed, according to the fueling strategies discussed previously. Intake valve closed (IVC) occurs during the intake stroke before bottom dead center (BDC) in this embodiment. Closing intake valve 80 before BDC results in an over-expanded cycle where the effective expansion stroke is longer than the effective compression stroke. In a normally aspirated engine this would result in a reduction of power because less air (oxygen) is introduced to combustion chamber 20 during the intake stroke. To offset this power reduction, a turbo-charger (not shown) or a super-charger (not shown) is employed to increase air manifold pressure such that an increased amount of air (oxygen) is introduced to the combustion chamber. Efficiency is increased without losing torque and power when intake valve 80 closes before BDC and air manifold pressure is increased. Another advantage in closing intake valve 80 before BDC is an increase in mixing time available for gaseous fuel introduced after the intake valve closes. In fueling regions B and C gaseous fuel is introduced after intake valve 80 closes. By increasing the time available for mixing combustion performance is improved by enhanced flame propagation through the gaseous fuel and air mixture.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method for introducing a gaseous fuel into a combustion chamber of an internal combustion engine comprises:
    (a) dividing an engine map into a first region, a second region, and a third region, wherein said engine operates in a first mode is in said first region, a second mode in said second region, and a third mode in said third region:
        (i) wherein said first region is a predetermined low load range and said first mode comprises
            introducing said gaseous fuel to said combustion chamber during an intake stroke before an intake valve closes;
        (ii) wherein said second region is a predetermined high load low-speed range and said second mode comprises
            injecting said gaseous fuel directly into said combustion chamber after said intake valve closes; and;
        (iii) wherein said third region is a predetermined high load high-speed range and said third mode comprises
            (1) introducing a first portion of said gaseous fuel into said combustion chamber during said intake stroke before said intake valve closes; and
            (2) injecting a second portion of said gaseous fuel directly into said combustion chamber after said intake valve closes.

2. The method of claim 1, further comprising:
    (b) introducing said gaseous fuel upstream of said intake valve such that it is inducted into said combustion chamber along with intake air, when said gaseous fuel is introduced during said intake stroke.

3. The method of claim 1, further comprising:
    (b) closing said intake valve before bottom dead center during said intake stroke.

4. The method of claim 1, further comprising:
    (b) closing said intake valve before bottom dead center during said intake stroke;
    (c) increasing intake manifold air pressure such that an increased amount of oxygen is inducted into said combustion chamber before said intake valve closes; and
    (d) timing for start of injection for injecting said gaseous fuel directly into said combustion chamber is between 180 and 210 crank angle degrees before top dead center.

5. The method of claim 1, further comprising:
    (b) closing said intake valve after bottom dead center during said compression stroke, wherein this timing for closing said intake valve is associated with said first mode when said engine is operating in said first region.

6. The method of claim 1 wherein one of said second and said third regions are divided by a fixed predetermined engine speed and said second and third regions are divided by a predetermined power demarcation line.

7. The method of claim 1 wherein when injecting said gaseous fuel directly into said combustion chamber, said gaseous fuel is supplied to a fuel injector with an injection pressure between 20 and 40 bar.

8. The method of claim 1, further comprising:
(b) compressing said gaseous fuel to said injection pressure when said gaseous fuel is stored in gaseous form; and
(c) pumping said gaseous fuel to said injection pressure when said gaseous fuel is stored in liquefied form, wherein when injecting said gaseous fuel directly into said combustion chamber, said gaseous fuel is supplied to a fuel injector with an injection pressure between 20 and 40 bar.

9. The method of claim 1 wherein when injecting said gaseous fuel directly into said combustion chamber, timing for end of injection is between 65 and 200 crank angle degrees before top dead center.

10. The method of claim 1 wherein when injecting said gaseous fuel directly into said combustion chamber, timing for start of injection is between 150 and 210 crank angle degrees before top dead center.

11. The method of claim 1, wherein said gaseous fuel is natural gas.

12. A method for introducing a gaseous fuel into a combustion chamber of an internal combustion engine comprising:
(b) introducing said gaseous fuel into said combustion chamber during an intake stroke in a first region of an engine map associated with operating said internal combustion engine;
(c) introducing said gaseous fuel into said combustion chamber during a compression stroke in a second region of said engine map after an intake valve associated with said combustion chamber closes; and
(d) introducing said gaseous fuel into said combustion chamber during both said intake stroke and said compression stroke in a third region of said engine map, wherein said first region is a low load region of said engine map, said second region is a high load region of said engine map below at least one of a predetermined power level and a predetermined speed, and said third region is a high load region of said engine map above said at least one of said predetermined power level and said predetermined speed.

13. The method of claim 12, wherein one of in said first region said gaseous fuel is introduced upstream of said intake valve and in said first region said gaseous fuel is directly introduced into said combustion chamber.

14. The method of claim 12, wherein in said second region said gaseous fuel is directly introduced into said combustion chamber.

15. The method of claim 12, wherein one of in said third region said gaseous fuel is introduced to said combustion chamber upstream of said intake valve during said intake stroke and directly introduced into said combustion chamber during said compression stroke and in said third region said gaseous fuel is directly introduced to said combustion chamber during said intake stroke and said compression stroke.

16. The method of claim 12, wherein said engine map is defined by a first engine parameter along an x-axis and a second engine parameter along a y-axis.

17. The method of claim 16, wherein said first engine parameter is engine speed, and said second engine parameter is one of torque and fuel quantity per cycle.

18. An apparatus for introducing a gaseous fuel into a combustion chamber of an internal combustion engine comprising:
(a) a fuel injection apparatus for introducing said gaseous fuel into a charge for said internal combustion engine, said fuel injection apparatus comprising:
(i) a direct fuel injector for injecting said gaseous fuel directly into said combustion chamber;
(ii) a controller programmed to actuate said fuel injection apparatus according to three modes, to:
(1) introduce gaseous fuel into said charge during an intake stroke while an intake valve associated with said combustion chamber is open, when said internal combustion engine is operating in a first mode, defined by a predetermined low load range;
(2) actuate said direct fuel injector to inject said gaseous fuel directly into said combustion chamber after said intake valve is closed, when said internal combustion engine is operating in a second mode, defined by a predetermined high load low-speed range; and
(3) split fuel injection into two pulses whereby a first portion of said gaseous fuel is introduced into said charge during an intake stroke while said intake valve is open, and a second portion is introduced by actuating said direct fuel injection to inject said fuel directly into said combustion chamber after said intake valve is closed, when said internal combustion engine is operating in a third mode defined by a predetermined high load high-speed range.

19. The apparatus of claim 18 wherein said fuel injection apparatus further comprises:
(iii) a port fuel injector associated with a port leading into said combustion chamber for introducing said gaseous fuel upstream of said intake valve whereby it is inducted into said combustion chamber with the intake charge.

20. The apparatus of claim 18 wherein said direct fuel injector is configured to introduce gaseous fuel into said charge during an intake stroke.

21. The apparatus of claim 18, wherein said gaseous fuel is natural gas.

22. The apparatus of claim 18, wherein one of said intake valve is configured to close during said intake stroke before bottom dead center and said intake valve is configured to close during said compression stroke after bottom dead center.

23. The apparatus of claim 18 wherein said intake valve further comprises variable valve timing capability, and the timing for closing said intake valve is different for at least two of said three modes.

24. The apparatus of claim 23 wherein said intake valve is closed during said compression stroke when said internal combustion engine is operating in said first mode.

* * * * *